United States Patent
Meijer et al.

(10) Patent No.: US 8,474,027 B2
(45) Date of Patent: Jun. 25, 2013

(54) REMOTE MANAGEMENT OF RESOURCE LICENSE

(75) Inventors: Henricus Johannes Maria Meijer, Mercer Island, WA (US); William H. Gates, III, Medina, WA (US); Thomas F. Bergstraesser, Kirkland, WA (US); Lili Cheng, Bellevue, WA (US); Nishant V. Dani, Redmond, WA (US); Daniel S. Glasser, Mercer Island, WA (US); Ira L. Snyder, Jr., Bellevue, WA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1321 days.

(21) Appl. No.: 11/613,332

(22) Filed: Dec. 20, 2006

(65) Prior Publication Data
US 2008/0083025 A1    Apr. 3, 2008

Related U.S. Application Data

(63) Continuation-in-part of application No. 11/536,869, filed on Sep. 29, 2006.

(51) Int. Cl.
*H04L 9/32*    (2006.01)

(52) U.S. Cl.
USPC .................................................. 726/9; 726/10

(58) Field of Classification Search
USPC ...... 713/153, 163, 183, 193, 340, 164; 707/1, 707/2, 5, 6, 9, 10; 709/203, 217, 223, 237, 709/225, 229, 227; 726/22, 14, 13, 11, 34, 726/25, 26, 27; 380/42, 55, 58, 46
See application file for complete search history.

(56) References Cited

U.S. PATENT DOCUMENTS

| 5,263,165 | A | 11/1993 | Janis |
| 5,495,576 | A | 2/1996 | Ritchey |

(Continued)

FOREIGN PATENT DOCUMENTS

| EP | 0915595 A2 | 5/1999 |
| EP | 1058429 A1 | 12/2000 |

(Continued)

OTHER PUBLICATIONS

Brunner, et al. "Disruption Tolerant Networking" Dagstuhl Seminar Proceedings (2005) NEC Europe Ltd., Network Laboooratories, 4 pages.

(Continued)

*Primary Examiner* — Brandon Hoffman
*Assistant Examiner* — Nega Woldemariam
(74) *Attorney, Agent, or Firm* — Lee & Hayes, PLLC

(57) ABSTRACT

A user-centric or identity-centric resource licensing system that manages access to 'cloud-based' resources (e.g., applications and services) is provided. A 'cloud' refers to a collection of resources (e.g., hardware and/or software) provided and maintained by an off-site or off-premise party (e.g., third party), wherein the collection of resources can be accessed by an identified user via a network. In accordance with the user-centric licensing model, the resource license (and subscription) rights can migrate with a user without regard to physical location, device used, or other contextual factors (e.g., activity engaged). Effectively, the rights are mapped (and tracked) as a function of a user identity, which can be a core identity or an identity based upon activity engaged, role, capacity, etc.

20 Claims, 13 Drawing Sheets

U.S. PATENT DOCUMENTS

| | | | |
|---|---|---|---|
| 5,537,404 | A | 7/1996 | Bentlet et al. |
| 5,588,914 | A | 12/1996 | Adamczyk |
| 5,859,972 | A | 1/1999 | Subramaniam et al. |
| 6,064,656 | A | 5/2000 | Angal et al. |
| 6,185,567 | B1 | 2/2001 | Ratnaraj et al. |
| 6,195,683 | B1 | 2/2001 | Palmer et al. |
| 6,209,039 | B1 | 3/2001 | Albright et al. |
| 6,219,652 | B1 | 4/2001 | Carter et al. |
| 6,226,260 | B1 | 5/2001 | McDysan |
| 6,341,127 | B1 | 1/2002 | Katsube et al. |
| 6,409,599 | B1 | 6/2002 | Sprout et al. |
| 6,415,288 | B1 | 7/2002 | Gebauer |
| 6,434,532 | B2 | 8/2002 | Goldband et al. |
| 6,469,991 | B1 | 10/2002 | Chuah |
| 6,496,482 | B1 | 12/2002 | Kubota |
| 6,620,043 | B1 | 9/2003 | Haseltine et al. |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,020,654 | B1 | 3/2006 | Najmi |
| 7,065,041 | B2 | 6/2006 | Sen |
| 7,373,377 | B2 | 5/2008 | Altieri |
| 2002/0124053 | A1 | 9/2002 | Adams et al. |
| 2002/0164025 | A1 | 11/2002 | Raiz et al. |
| 2003/0105734 | A1 | 6/2003 | Hitchen et al. |
| 2003/0229623 | A1 | 12/2003 | Chang et al. |
| 2004/0003270 | A1 | 1/2004 | Bourne et al. |
| 2004/0049537 | A1 | 3/2004 | Titmuss |
| 2004/0076160 | A1 | 4/2004 | Phaltankar |
| 2004/0098456 | A1 | 5/2004 | Kryzanowski et al. |
| 2004/0210771 | A1* | 10/2004 | Wood et al. ............... 713/201 |
| 2004/0220878 | A1* | 11/2004 | Lao et al. ............... 705/51 |
| 2005/0033669 | A1 | 2/2005 | Stremler et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0041606 | A1 | 2/2006 | Sawdon |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2007/0115123 | A1 | 5/2007 | Roberts et al. |
| 2007/0136572 | A1 | 6/2007 | Chen et al. |
| 2008/0178298 | A1* | 7/2008 | Arai et al. ............... 726/29 |

FOREIGN PATENT DOCUMENTS

| | | |
|---|---|---|
| EP | 1376309 A2 | 1/2004 |
| EP | 1524580 A2 | 4/2005 |
| EP | 1564622 A2 | 8/2005 |
| JP | 2001282634 A | 10/2001 |
| WO | WO0008814 A1 | 2/2000 |
| WO | WO04002107 A1 | 12/2003 |
| WO | 2005022826 | 3/2005 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29 , Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf&identifier=oai:arXiv.org:cs/0502091. Last accessed Sep. 20, 2006.

Non-Final Office Action for U.S. Appl. No. 11/536,869, mailed on May 7, 2012, Nishant V. Dani et al., "Aggregated Resource License", 32 pages.

Office action for U.S. Appl. No. 11/613,332, mailed on Jun. 19, 2012, Meijer et al., "Remote Management of Resource License", 16 pages.

* cited by examiner

REMOTE MANAGEMENT OF RESOURCE LICENSE

CROSS REFERENCE TO RELATED APPLICATIONS

This application is a continuation in part of U.S. patent application Ser. No. 11/536,869, filed on Sep. 29, 2006, and entitled AGGREGATED RESOURCE LICENSE, the entirety of which is incorporated herein by reference.

BACKGROUND

Conventionally, most computational tasks are undertaken upon a client or within a proprietary intranet. For instance, through utilization of a software application resident upon the client, data is created, manipulated, and saved upon a hard drive of the client or on an on-site server. Client-side operating systems are employed to manage relationships between users, software applications, and hardware within a client machine, as well as data that is resident upon a connected intranet.

The conventional computing paradigm is beginning to shift as maintaining security, indexing data, and the like on each client device can be quite expensive. As network connectivity has continued to improve, it has become apparent that a more efficient computing model includes lightweight (e.g., inexpensive, thin) clients that continuously communicate with third-party computing devices to achieve substantially similar end results when compared to the conventional computing paradigm. In accordance with this architecture, the third-party can provide a 'cloud' of devices and services, such that requests by several clients can simultaneously be serviced within the cloud without the user noticing any degradation in computing performance.

One area of particular interest is how to ensure adherence to license agreements. End user license agreements (EULAs) are often put into place between a software vendor and the end user in order to set the terms and conditions of use. Essentially, the EULA is a legal agreement between the manufacturer and purchaser of software. It is most often either printed on the packaging or displayed on screen at time of installation. In most instances, the latter is a more effective method, because it cannot be avoided. In other words, to use the software, the user clicks "Accept" or "I Agree" to the EULA. Thus, the license stipulates the terms of usage, whether the user reads them or not.

Overall, most EULAs limit the number of concurrent device uses with respect to a single copy of a software program. In some instances, multiple installations are permitted in accordance with the terms of the EULA. However, in either case, conventional licenses are device-centric as they prohibit installations based upon characteristics and number of devices, central procession units, etc. As well, EULAs often disclaim all liabilities for what might happen in the user's computer when the software is running. Many times, the EULA generally does not guarantee anything except that the disk will be replaced if defective. In other words, most EULAs today attempt to control the installation and use of a software application while disclaiming any liability on the part of a software vendor for damage to data, hardware or the like.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a user-centric or identity-centric resource licensing system that manages access to 'cloud-based' (e.g., off-premise) resources as well as resident (e.g., on-premise) resources (e.g., applications, data and services). As used herein, a 'cloud' refers to a collection of resources (e.g., hardware, data and/or software) provided and maintained by an off-site or off-premise party (e.g., third party), wherein the collection of resources can be accessed by an 'identified' user via a network. The resources can include data storage services, data processing services (e.g., software applications), and many other services that are conventionally associated with and resident within personal computers or local servers.

As described above, with respect to software, traditional licenses (end user license agreements (EULAs)) are device-centric as a user is most often permitted to install a software application onto as many machines as the particular terms of a license permits. Contrary to conventional systems, the subject innovation discloses a 'user-centric' or 'identity-centric' resource licensing model. This licensing model can be aggregated, maintained and managed within a computing environment where clients can simultaneously be serviced within a 'cloud' without the user noticing any degradation in computing performance. In other embodiments, tokens or other user-specific objects can be used to convey identity and/or license rights. In specific examples, these tokens or objects can be encrypted and when decrypted by a resource host, can be employed to authorize access to resources at disparate locations (e.g., disparate client environments, 'cloud-based' locations).

In other aspects, an aggregated resource license system can be employed whereby record of persistent licenses can be maintained within the 'cloud' or within a transferable token and accessed or provided upon request to use a particular application. By way of example, an enterprise can employ a local service that manages the enterprise local assignment of licenses to specific identities. Moreover, the enterprise can communicate the aggregate license statistics to the cloud-based service.

In accordance with the user-centric licensing model of the subject innovation, the resource license (and subscription) rights can migrate with a user without regard to physical location, device used, resource host or other contextual factors (e.g., activity engaged, current capacity/role). As described above, this aggregated persistent license can regulate access to off-premise as well as local (e.g., on-premise) resources.

Physiological and/or environmental sensors can be employed to establish an identity of a user. Subsequently, this identity can be mapped to respective resource license rights maintained within the 'cloud.' Biometric and context information can be employed to determine or infer user identity. It is to be understood that a single user can have multiple identities, each corresponding to specific license and/or subscription rights within the 'cloud.'

In accordance with the 'cloud' infrastructure, resources (e.g., applications, data, services, hardware) can be maintained within the 'cloud' and rendered in response to user (e.g., client) requests as a function of an established identity and corresponding rights. By way of example, when a client requests or prompts use of an application, the system can automatically establish the client's 'identity', map the identity to a valid license right, and render the application (or portion thereof) as appropriate. In still other aspects, multiple 'identities' can be maintained within the 'cloud' for a single user. For example, a user might have a 'home' identity and a 'work' identity, each having different rights, preferences and limitations.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
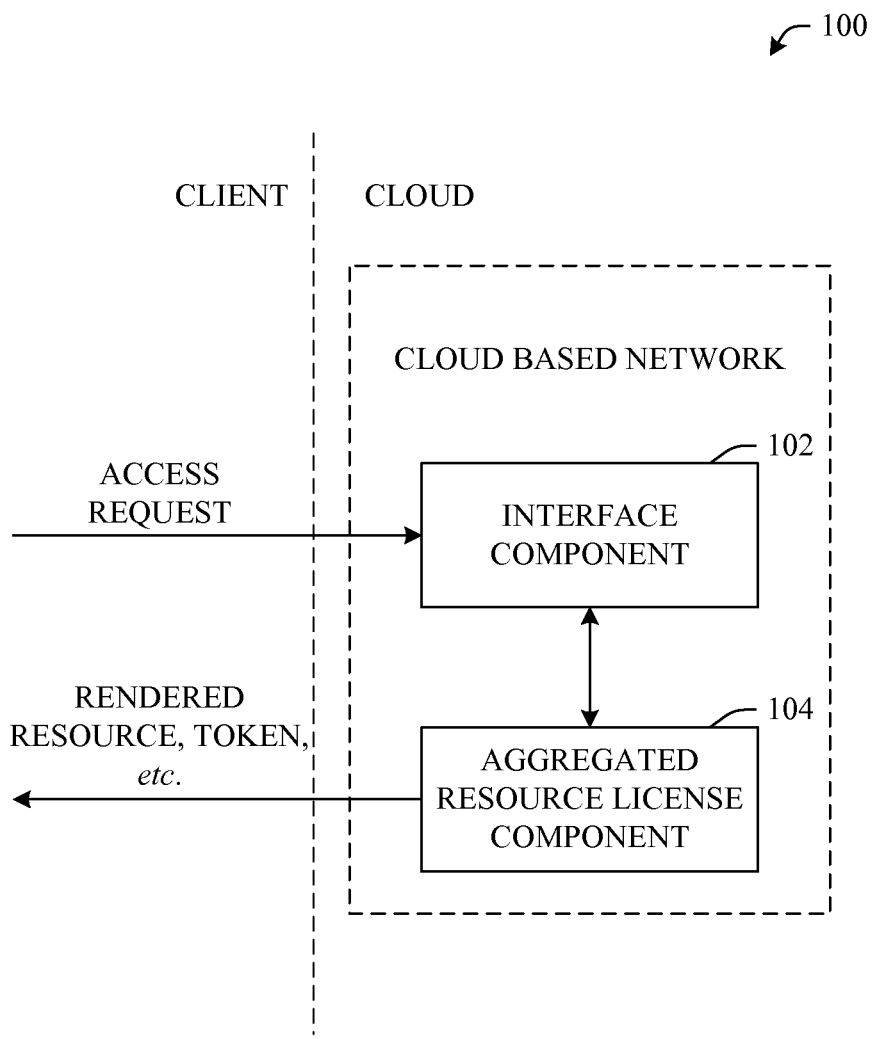
FIG. 1 illustrates a central license management system in accordance with an aspect of the innovation.

The following terms are used throughout the description, the definitions of which are provided herein to assist in understanding various aspects of the subject innovation. It is to be understood that the definitions are not intended to limit the scope of the disclosure and claims appended hereto in any way. As used herein, a 'cloud' can refer to a collection of resources (e.g., hardware, data and/or software) provided and maintained by an off-site party (e.g., third party), wherein the collection of resources can be accessed by an identified user over a network. The resources can include data storage services, word processing services, and many other general purpose computation (e.g., execution of arbitrary code) and information technological services that are conventionally associated with personal computers or local servers.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms 'component' and 'system' are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to 'infer' or 'inference' refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates remote management and/or aggregation of resource licenses (e.g., software application license, service subscription rights). Accordingly, the management/aggregation can occur within a 'cloud' as well or other location/mechanism that provides for a 'user-centric' aspects rather than the exclusive 'device-centric' aspects of conventional models. It is to be understood that the cloud-based license management can be applied to a first party license as well as a third party license.

Moreover, it will be appreciated that this aggregation of resource licenses can be applied to both cloud-based as well as locally-based resources. By way of example, the innovation can provide for a system 100 that aggregates all persistent license rights that correspond to a particular user or identity. In operation, this off-premise persistent license can regulate access to the services of a particular resource. By way of more particular example, if a persistent license is in place that corresponds to resource 'A', a user can employ resource 'A' no matter where the resource or the instance of the resource resides. Effectively, the innovation enables the aggregation of license rights such that all rights can be in a single location.

In operation, when a user attempts to engage with some entity, for example 'A', a license can be obtained to use a particular resource within the entity. As well, a 'secret message' (e.g., token) can be obtained for later delivery to another entity with regard to the use of the particular resource. Continuing with the example, when the user engages with a similar entity, for example 'B', to employ the same resource but on a disparate device, the 'secret message' can be delivered. It will be understood that 'B' can represent a subsequent communication with entity 'A.'

In the aforementioned example, it is important to note that a protocol is described whereby the entities can verify the identity of the user access to a resource is requested. As described supra, this resource can be distributed on a local device, 'cloud-based' or any combination thereof. Essentially, the protocol of the innovation enables the entities to verify that the identity of the user is indeed the identity of the original user that was granted license rights (e.g., by 'A' in the example above).

More particularly, the innovation discloses mechanisms whereby the identity, and corresponding license rights, can be established without communication between the entities (e.g., 'A' and 'B' above). These entities can be physically distributed, cloud-based, or a combination thereof. As well, although the example describes two entities, it is to be appreciated that the functionality of authentication/authorization described herein can be applied to any number of entities without departing from the spirit and/or scope of the innovation and claims appended hereto. Essentially, in one embodiment, the user can be granted/issued a token from the first entity (e.g., 'A'). This token (e.g., secret message) can include the specific terms of a license.

Continuing with the example above, entities 'A' and 'B' can share a public/private key pair. Upon the first interaction with 'A', the user identity can be encrypted and given to the user as token T. Thus, upon each subsequent interaction with disparate entities, the identity can be verified by decrypting the key provided by the use at the time of a subsequent interaction.

In other words, let 'U' be representative of the user in the example above. Additionally, 'X' can represent the object, h( ) can be a desired hash function and can denote concatenation. In operation, 'U' establishes a secure authenticated channel with 'A', under which it receives 'X'. In addition, 'A' sends 'U' his/her signature 'S' on h(X||U). Accordingly, when 'U' establishes a secure authenticated channel with 'B', 'X' and 'S' can be delivered. As will be understood, with this information, 'B' will be able to authenticate the identity of U via decryption. If successful, U can be authorized to employ the requested resource.

Although many of the scenarios and examples that follow apply to management of access to cloud-based resources, it is to be understood that the aggregation of license rights described herein can be directed to both on-premise (e.g., local) as well as off-premise (e.g., cloud-based) resources without departing from the spirit and/or scope of the innovation and claims appended hereto. These on-premise/off-premise license aggregation scenarios are to be included within the scope of this disclosure and claims appended hereto.

As illustrated in FIG. 1, system 100 can include a cloud-based network system that receives an access request from a client and processes the request in accordance with applicable rights based upon a user 'identity'. Continuing with the aforementioned example, an identity-based token can be provided and used for subsequent authorization/authentication. As will be understood upon review of the figures that follow, the access request can be a request to access a cloud-based resource such as a software application, a service subscription, a data storage authorization or the like. Effectively, the cloud-based rights management disclosed within this specification can be employed in connection with most any resources maintained within a 'cloud' as well as those resources maintained locally within client environment(s).

The following examples are included to add perspective to aspects of the functionality of the innovation. It is to be understood that these examples not intended to limit the scope of the innovation in any way. These examples are to be included within the scope of the disclosure and claims appended hereto.

In a first example, suppose a user acquires a license for an application against a specific identity. The application can be installed on a current device. In accordance with the functionality of the innovation, when the user moves to a second device and login, the license can be recognized (e.g., via the aggregated license functionality) thereafter automatically enabling the application on the second device. Specifically, the license can be 'user-centric' thereby following a user and regulating resource access based upon identity.

Optionally, if the second device does not have the application installed then, as part of the login, the system may automatically install the application following an authentication/authorization process. On the other hand, if the application is installed upon the second entity, the system can merely authenticate the user (e.g., by decrypting a token) in order to determine access rights.

Furthermore, in a cloud-based scenario as illustrated in FIG. 1, as part of the login, the system may pull in application specific settings from remote (e.g., cloud-based sources). Thus, the system could provision and configure entire devices at the time of login—to enable the user to access all the applications to which the user (or specific identity) has license to. It will be understood that, as broadband speeds increase, this on-demand high speed install can be easily enabled. Once installed, access to the software (or resource) can be limited to those users who have license to the software (or resource).

Further, the innovation can also enhance subscription-based resource pricing. In accordance therewith, a user may be granted access to applications for a period of time and then the license can be automatically withdrawn on expiry. Still further, the innovation can also support aggregate pricing. In this scenario, all available software within the cloud or appropriate entity (e.g., 'A' and 'B' above) can be packaged under a single license that is valid for a specified period of time (e.g., month or a year or some other fixed period of time). The user can extend the subscription as needed. As part of the subscription, as new software is released, it can be automatically provisioned for the user in accordance with rights granted to a specific identity.

The system can also support pre-installation of software as an optimization. In this scenario, software can be pre-installed and as the user is granted or denied the license the software can be enabled or disabled respectively. Again, this enable/disable action can be controlled by an identity specific or user-centric token or key. The pre-install is an optimization which eliminates installation upon login. It can also be possible to pre-installed software so that the box always carries the latest version of the software irrespective of the license status of the user.

Generally, with respect to the cloud-based network of FIG. 1, an interface component 102 and an aggregated resource license component 104 can be employed to manage (e.g., authorize) access to cloud-based resources. The interface component 102 can receive an access request from a user or group of users and communicate the request to the aggregated resource license component 104. For example, the encrypted token described above can be provided to the interface component 102 in order to prompt access to a particular/desired resource. As well, in another example, the interface component 102 can monitor user activity and proactively suggest a resource in accordance with or as a function of the aggregated resource license component 104.

The aggregated resource license component 104 can be employed to establish an identity of the user, map the identity to a license right and to render the resource in accordance with the applicable license right(s). For instance, the aggregated resource license component 104 can decrypt the token provided by the user in order to authenticate/authorize the user. Further, the aggregated resource license component 104 can be employed to render the resource(s) in accordance with a user preference. By way of example, the aggregated resource license component 104 can select the appropriate resource in accordance with a user profile, user history or other appropriate criterion. Additionally, as described in greater detail infra, machine learning and/or reasoning (MLR) mechanisms can be employed to infer and/or suggest a resource based upon an applicable license right.

As described above, conventionally, software licenses are device-centric as a user is most often permitted to install a software application onto as many machines as the particular terms of a license permits. For example, some traditional software licenses are based upon concurrent uses such that a user can install a software application both on a home computer as well as an office computer since it is assumed that a single user can only operate a single device at a time. However, as a condition of the license, concurrent use of multiple copies of the software was prohibited. Conventional licensing systems do not provide effective ways to manage and/or prohibit concurrent uses.

In connection with various embodiments, the subject specification discloses user-centric or identity-centric licensing models that employ computing environments where clients can simultaneously be serviced within a 'cloud' without the user noticing any degradation in computing performance. As well, the innovation discloses mechanisms whereby access to resources installed on multiple on-premise devices can be regulated via an aggregated source. As such, an aggregated resource license component 104 can be employed whereby a record of valid licenses can be maintained within the 'cloud' and accessed upon request to use a particular resource (e.g., application, data or service). In accordance with an aspect of the licensing model, software license rights can migrate with a user without regard to physical location, device used, or other contextual factors.

In one aspect, a user logon can be employed to establish identity of a user. Subsequently, this identity can be mapped to respective application license rights maintained within the 'cloud' thereby managing access to cloud-based resources. Other aspects can employ biometric and context information to determine and/or infer a user identity. Still further, portable memory devices (e.g., USB drives) can be employed to carry a token which can be used to authenticate a user and to authorize or deny access to resources.

In still another aspect of the 'cloud' infrastructure, resources can be maintained within the 'cloud' and rendered in response to user (e.g., client) requests based upon any number of triggers. For example, when a client requests to use a resource, the system can automatically establish the client's identity, map the identity to a valid license right, and render the application (or portion thereof) as appropriate. In this scenario, a token or other secret identity information can be provided to the user for use in subsequent requests for the same resource. It is to be understood that multiple 'identities' can be maintained within the 'cloud' and associated with a single user. For example, in one aspect, a user might have a 'home' identity and a 'work' identity, each having different rights, preferences and scope.

As described above, although cloud-based components are shown in FIG. 1 and the figures that follow, it is to be understood that all of, or a portion thereof, the functionality of the interface component 102 and/or aggregated resource license component 104 can be distributed among client environment(s) without departing from the spirit/scope of the innovation. These additional scenarios are to be included within the scope of this disclosure and/or claims appended hereto.

Figure 2:
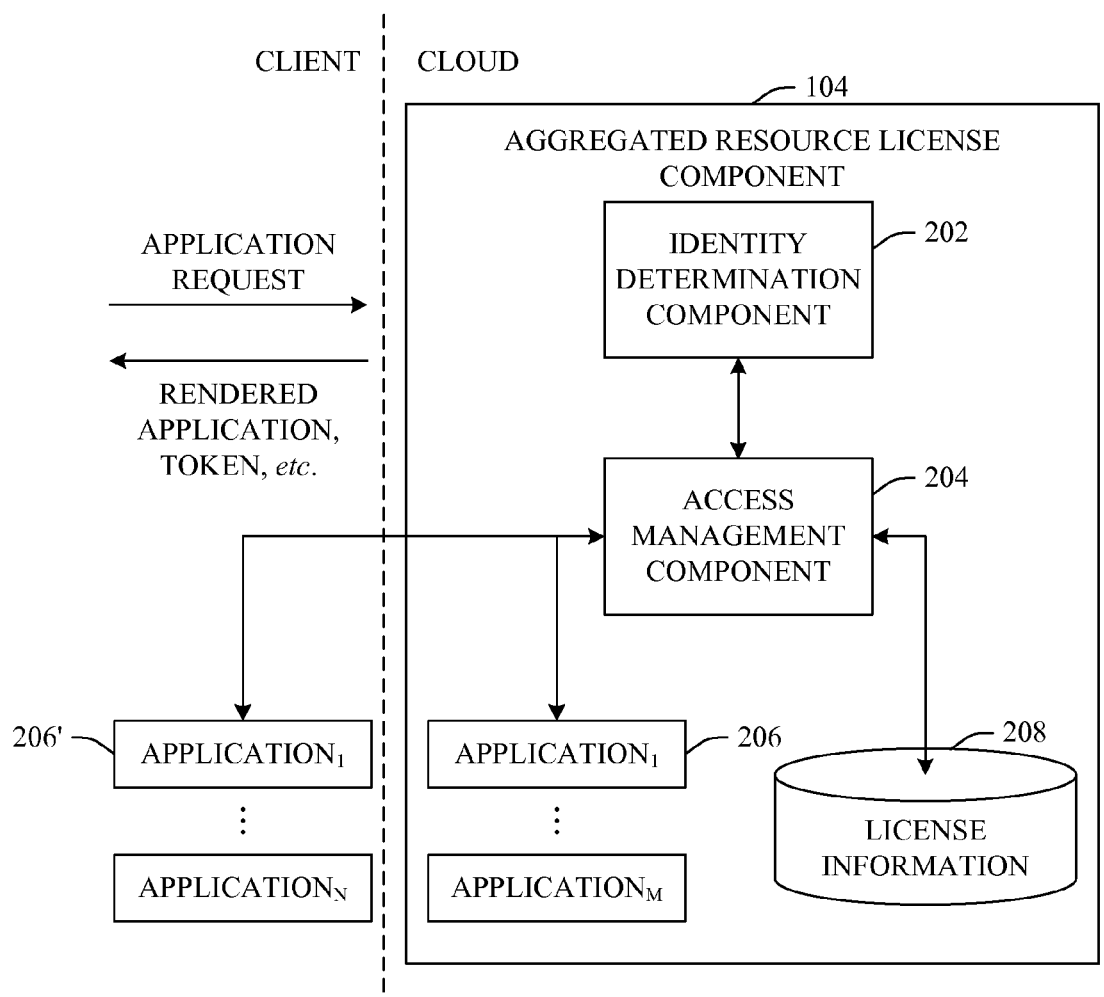
FIG. 2 illustrates an aggregated resource license management system that employs an identity determination component and an access management component in accordance with an aspect of the innovation.

Referring now to FIG. 2, a more detailed block diagram of aggregated resource license component 104 in accordance with an embodiment is shown. Generally, aggregated resource license component 104 can include an identity determination component 202 and an access management component 204. The identity determination component 202 facilitates establishing an identity of a resource requestor. For instance, the identity determination component 202 can be employed to decrypt an identity token in order to establish a particular identity associated to a license. Unlike conventional systems that merely establish a valid license or subscription right, the subject specification discloses mapping the license right to a determined and/or inferred 'identity' of a user. In other words, where conventional systems simply verify that a license or subscription is valid in connection with a user, these systems do not consider the actual 'identity' of a user (e.g., that the user is who they purport to be). In addition to determining the actual 'identity' of the user, the subject innovation also considers (and employs) the current 'identity' of the user in order to regulate and/or manage access to resources (e.g., cloud-based and/or client-based). As will be understood upon a review of the figures that follow, a single user can have multiple contextually-based identities (e.g., home, office, personal).

The identity determination component 202 facilitates establishment of the actual identity of a requestor. Rather than merely employing a device address or the like to determine eligibility, the identity determination component 202 can determine (e.g., via decryption) and/or infer the actual identity of the user (e.g., authorization as a function of actual identity). As will be understood upon a review of the figures that follow. The identity determination/inference can be based upon various factors including challenge/response, historical data, biometrics, cryptographic authentication protocols, digital signatures, etc. Once the identity is determined, the access management component 204 can map a requested off-premise resource (e.g., application 206) and/or and on-premise resource (e.g., application 206') to an appropriate license maintained within the off-premise license information store 208.

The innovation can regulate access to 1 to M off-premise resources (e.g., applications) and 1 to N on-premise resources (e.g., applications), where M and N are integers. It is to be understood that 1 to M and 1 to N applications can be referred to individually or collectively as applications 206 and 206'. Although the license information store 208 is illustrated in an off-premise environment, it is to be understood that this store can also be distributed in an on-premise environment or alternatively, in a combination of both on and off-premise environments.

As shown in FIG. 2, the subject innovation facilitates management of on-premise and/or off-premise license agreements in accordance with a user-centric (or identity-centric) focus. Effectively, the aggregated resource license component 104 facilitates management of access to on and/or off-premise resources (e.g., software, data, services, hardware) based upon the identity of a requester. Although specific mechanisms of determining, establishing and/or inferring identity are described herein, it is to be understood that any mechanism of determining identity can be employed in alternative aspects without departing from the spirit and scope of the innovation and claims appended hereto.

In an example, suppose a user is not actively connected to the cloud environment, in these situations, the system can provide for a local authentication/authorization to verify that a particular identity is permitted to access selected resources (on and/or off-premise). As well, the system can leverage conventional device-centric licenses by mapping a user identity to a particular device thereafter authorizing use of a resource based upon a valid device license.

Figure 3:
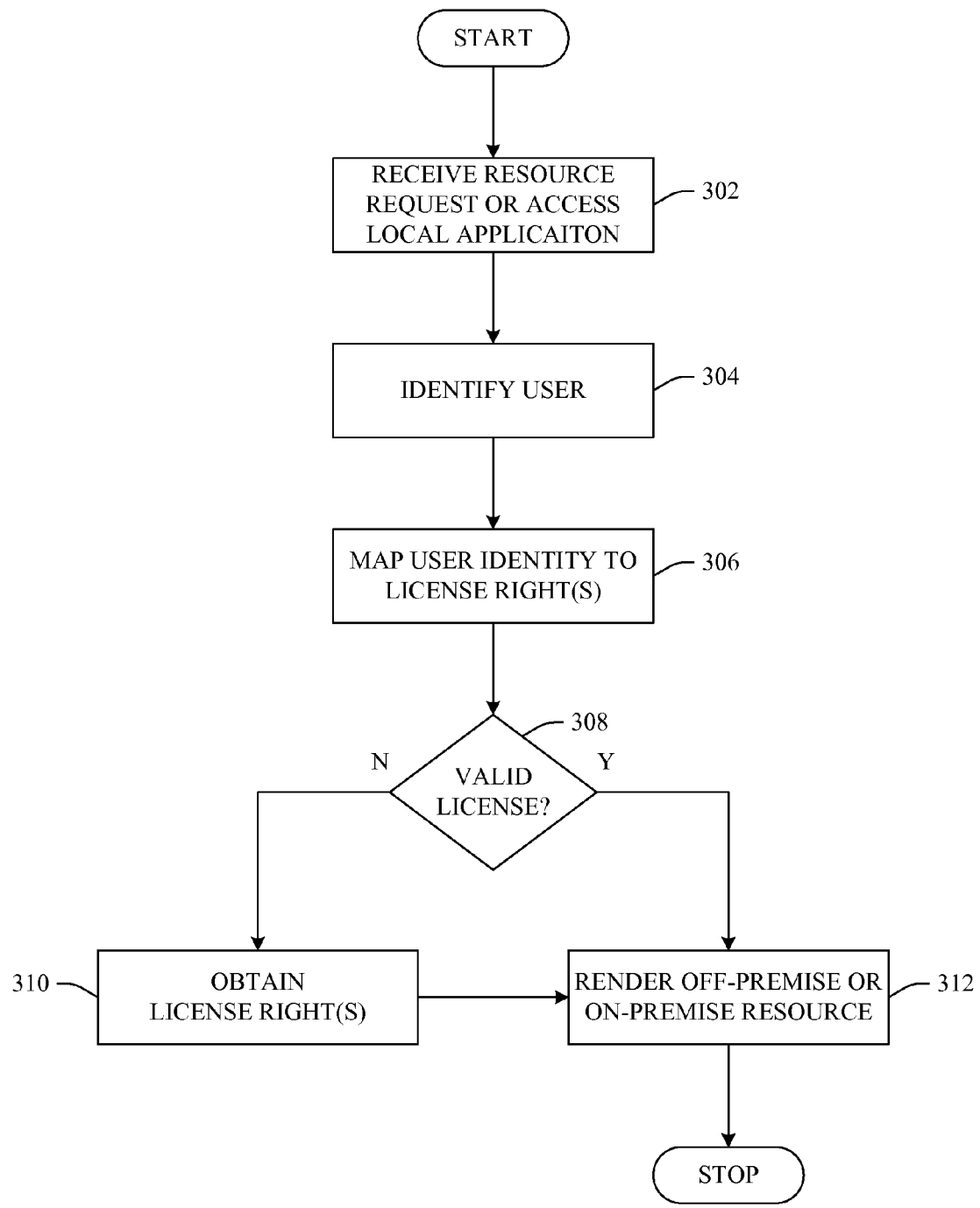
FIG. 3 illustrates an exemplary flow chart of procedures that facilitate mapping rights as a function of an identity in accordance with an aspect of the innovation.

FIG. 3 illustrates a methodology of identity-centric authorization in accordance with an aspect of the specification. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302, an access request is received from a user. As described above, the access request can be associated with any on-premise (e.g., local) or off-premise (e.g., cloud-based) resource such as an application or service. It is to be appreciated that, in accordance with aspects, both the resources as well as the aggregated license information can be maintained and managed off-premise (e.g., in a cloud-based environment). As used herein, 'off-premise' is meant to refer to a location (or locations) different from that of the requester (e.g., client device or user) whether cloud-based or located in a different physical location from the user.

At 304, the user (or requestor) identity is determined. For example, the identity can be established through the use of biometrics, context analysis, challenge/response, token decryption, etc. In operation, these factors can be employed to determine or infer the identity via MLR techniques and/or mechanisms. Once the identity is established, at 306, it can be mapped to an appropriate license that corresponds to the resource requested. A determination can be made a 308 which establishes if the mapped license right exists and/or is valid. If a license right does not exist or is not valid, at 310, a license right(s) can be obtained. Next, as shown, at 312, the requested 'off-premise' or 'on-premise' resource can be rendered in accordance with the applicable terms of the license right(s) (or other applicable permissions).

Figure 4:
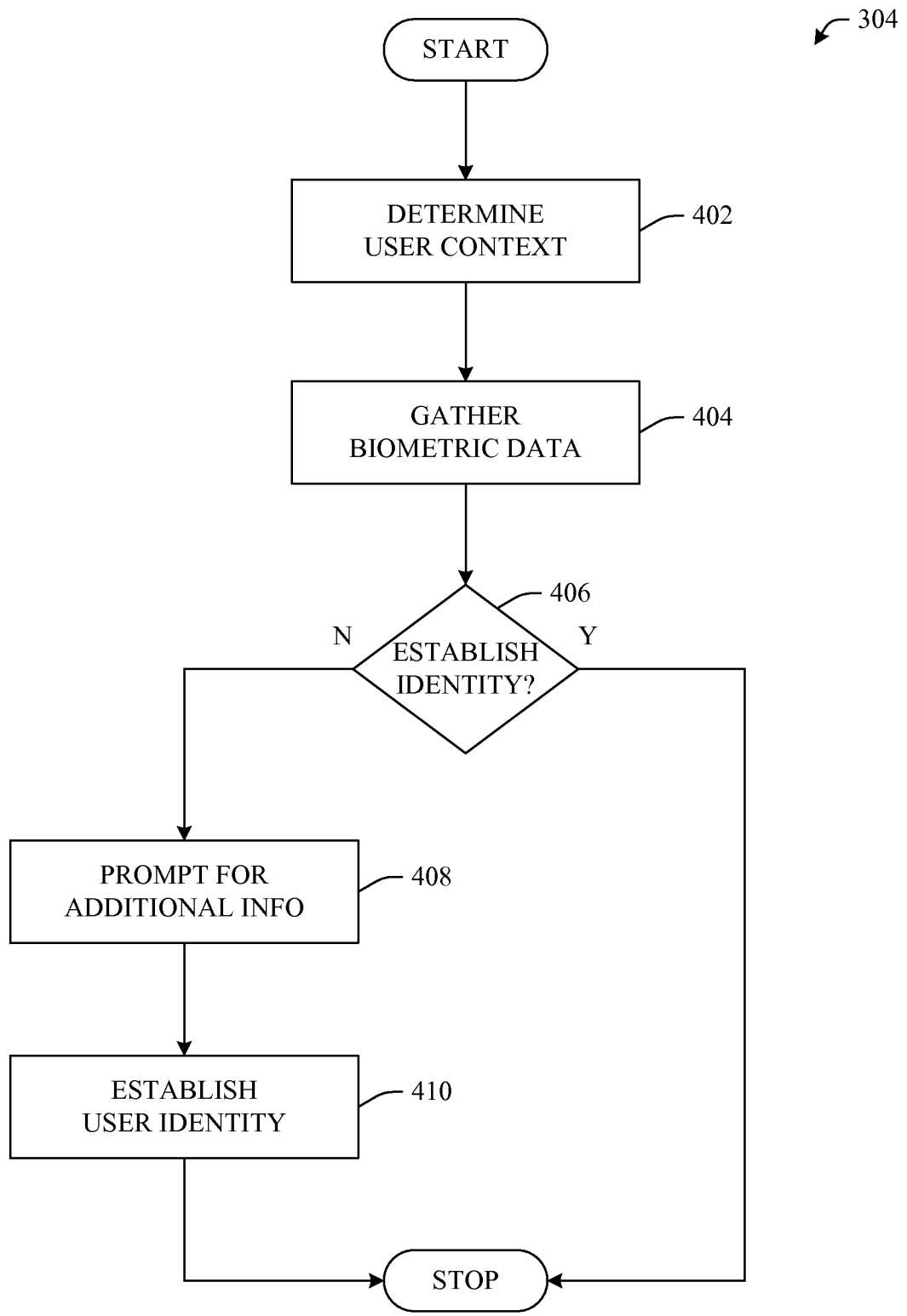
FIG. 4 illustrates an exemplary flow chart of procedures that facilitate establishment of a user identity in accordance with an aspect of the innovation.

Referring now to FIG. 4, there is illustrated a methodology 304 of establishing identity of a user in accordance with an aspect of the innovation. At 402, context factors can be determined. For example, context information (e.g., current activity engaged in, role, organization affiliation, current location, direction of travel, device profile) can be established. It will be understood that this information can be established using a variety of sources that include sensors, content analysis mechanisms, etc. It is to be appreciated that the context information can be used to establish identity as well as to facilitate identification of an appropriate resource to render to a user. For instance, if the user requests a media player via a smartphone while in an airport waiting for a flight. The context information can be employed to determine, with a high degree of certainty, an appropriate media player to render. Additionally, this context information can assist in an identification of the user.

Moreover, and optionally, at 404, biometric information and historical data can be gathered in order to facilitate identification of the user. By way of example, this biometric information can include a facial scan made available via the image capture device of a smartphone. Similarly, the biometric information can include voice recognition via a microphone and fingerprint recognition via pattern recognition systems. It is to be understood that other types of biometric information (e.g., physiological and/or behavioral information) can be used to establish identity of a user.

At 406, a determination is made if identity has been established. If the identity of a user is sufficiently established, a stop block is reached. On the other hand, if the identity is not sufficiently established, a prompt can be sent to the user to supply additional information at 408. For example, the system can employ a spontaneous challenge/response system which can generate a challenge to a user that requests information only known to a user (e.g., personal information, historical activity information). The user can reply with a response which can assist in increasing the degree of certainty of user identification.

Once the information is gathered, the user identity is established at 410. As described with reference to FIG. 3, this identity can be mapped to license rights related to access to applications or access to service-based resources. For instance, once the identity is established, the resource request can be acknowledged by rendering an appropriate application and/or service that satisfies the request.

It is to be understood that in other embodiments, a token can be provided and thereafter decrypted to determine an identity associated to a license right. This decrypted token (e.g., identity) can be compared to the identity of the requester in order to authenticate and/or authorize access.

Figure 5:
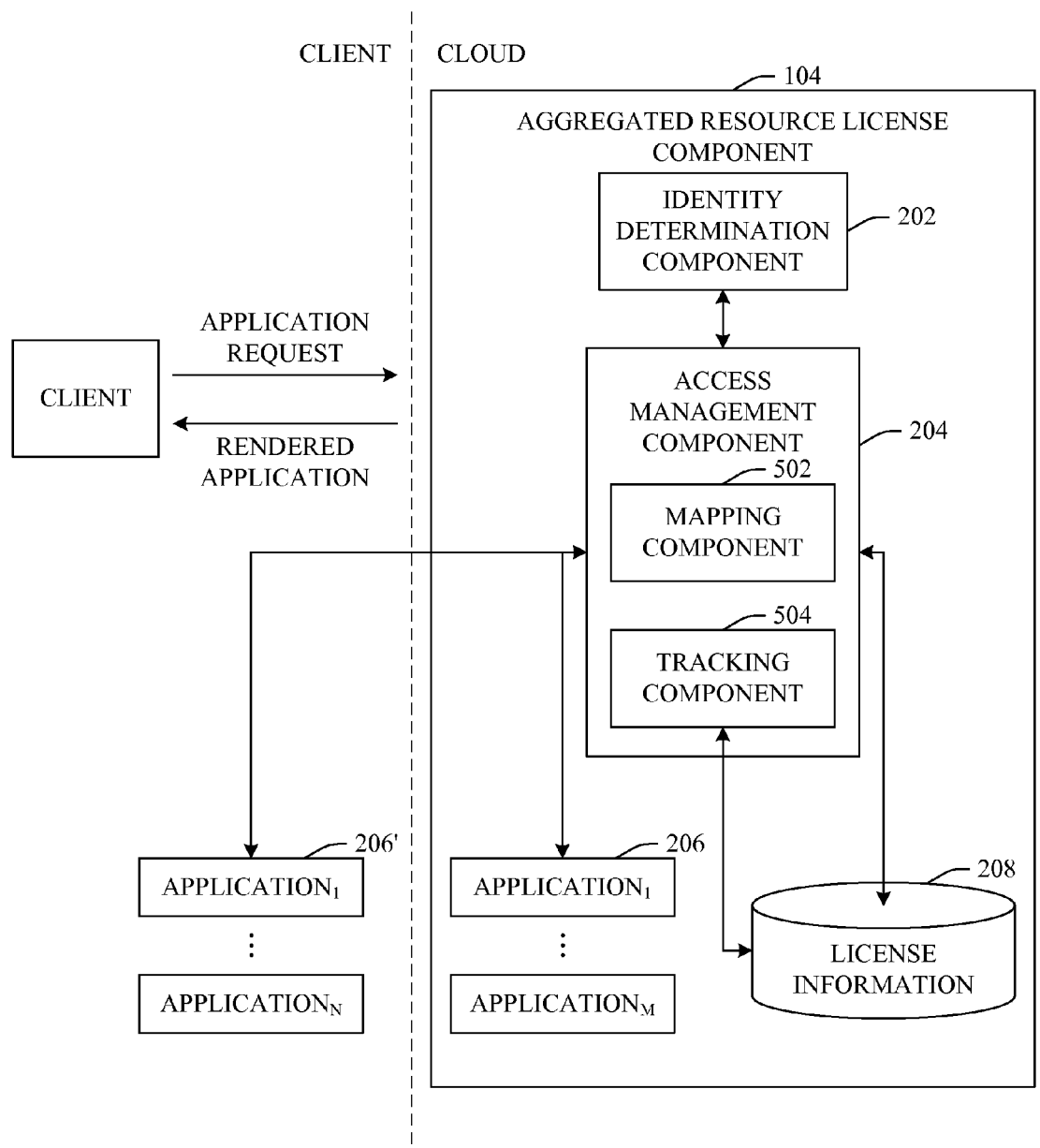
FIG. 5 illustrates a block diagram of an aggregated resource license system that employs a mapping component and a tracking component that manage license information in accordance with an aspect of the innovation.

Turning now to FIG. 5, an alternative block diagram of an aggregated resource license component 104 is shown in accordance with an aspect of the innovation. As shown, the access management component 204 can include a mapping component 502 and a tracking component 504. These components (502, 504) can facilitate identifying an appropriate resource (and corresponding license) and thereafter monitoring the use of the appropriate resource in accordance with the license respectively.

As described above, once an identity is established via the identity determination component 202, the mapping and tracking components (502, 504) can be employed to facilitate delivery of or access to a resource(s) (e.g., application, services) in accordance with the license rights associated to the particular identity. It is to be appreciated that, even if a subscription is valid for a user, when the identity does not match the subject user, the aggregated resource license system 202 can deny access to the resource (e.g., application 206).

In other aspects, the aggregated resource license component 104 can render or provide access to resource(s) (e.g., application 206) based upon a valid license irrespective of the 'actual' identity of the user. It is to be appreciated that these alternative aspects are not intended to limit the functionality of the specification in any way or to affect the scope of the claims appended hereto. Rather, it is to be understood that, in addition to mapping a user identity to a resource, the aggregated resource license component 104 can also map an appropriate resource to an appropriate license right based upon contextual factors related to the user and/or client device.

The mapping component 502 can be employed to map a user identity to a desired (or appropriate) resource (e.g., application 206). Similarly, the mapping component 502 can map a license right related to the resource. In operation, the license right can be searched for and located within an 'off-premise' license store (e.g., license information 208). In other words, in accordance with the specification, all hardware, software and data can be co-located 'off-premise' as related to the client or user. As described above, it is to be understood that this core network foundation or architecture is referred to herein as a 'cloud-based' network.

The system may also allow an enterprise to track the licenses against the local identities of their users. The enterprise may host an on-premise service that manages licenses and communicates aggregate license information to and from the cloud service. For instance, the cloud service may provision that the enterprise has license for 100 users. The cloud service can grant a license for managing the licenses for 100 users to the on-premise service. The identity of the specific 100 users may further be only known to the on-premise service, while specific aggregate information such as current number of licenses granted is shared with the cloud service.

Thus, the system could support at least two types of configurations—a pure 'cloud only' configuration where the cloud holds all the license information and a 'hybrid' configuration where the cloud holds some information while the on-premise environment holds some overlapping and some non-overlapping information. In the later case, the cloud service and the on-premise service in combination provide the full licensing function.

In addition to mapping the identity to a license right, a resource to a license right and ultimately an identity to an available resource via mapping component 502, the subject specification discloses a component for tracking (e.g., 504) whereby the use of a resource can be monitored. This use information can be employed to update the license information 208. As such, these updates can be employed when mapping future license information to an identity and subsequently regulating access to a particular resource.

By way of example, in the event that a license is based upon a specified number of uses, the tracking component 504 can be employed to update the license information 208 based upon each use. As well, the information obtained by the tracking component 504 can be employed to monetize and/or compensate the appropriate licensor for use of a resource within the 'cloud-based' network. For instance, suppose a user purchases a license for X number of uses of a digitally protected media (e.g., music, video). Here, the tracking component 504 can track the number of uses and can update the license information 208 based upon the uses. This updated information can subsequently be used to determine if a valid license right exists for future use.

Still further, as described above, it is to be understood that authentication and/or authorization can be determined without communication between the environments. Specifically, in the case of a token, the token can carry all of the appropriate license rights and terms associated with a specific user identity. Once the identity is established, access can be appropriately granted and/or denied.

Figure 6:
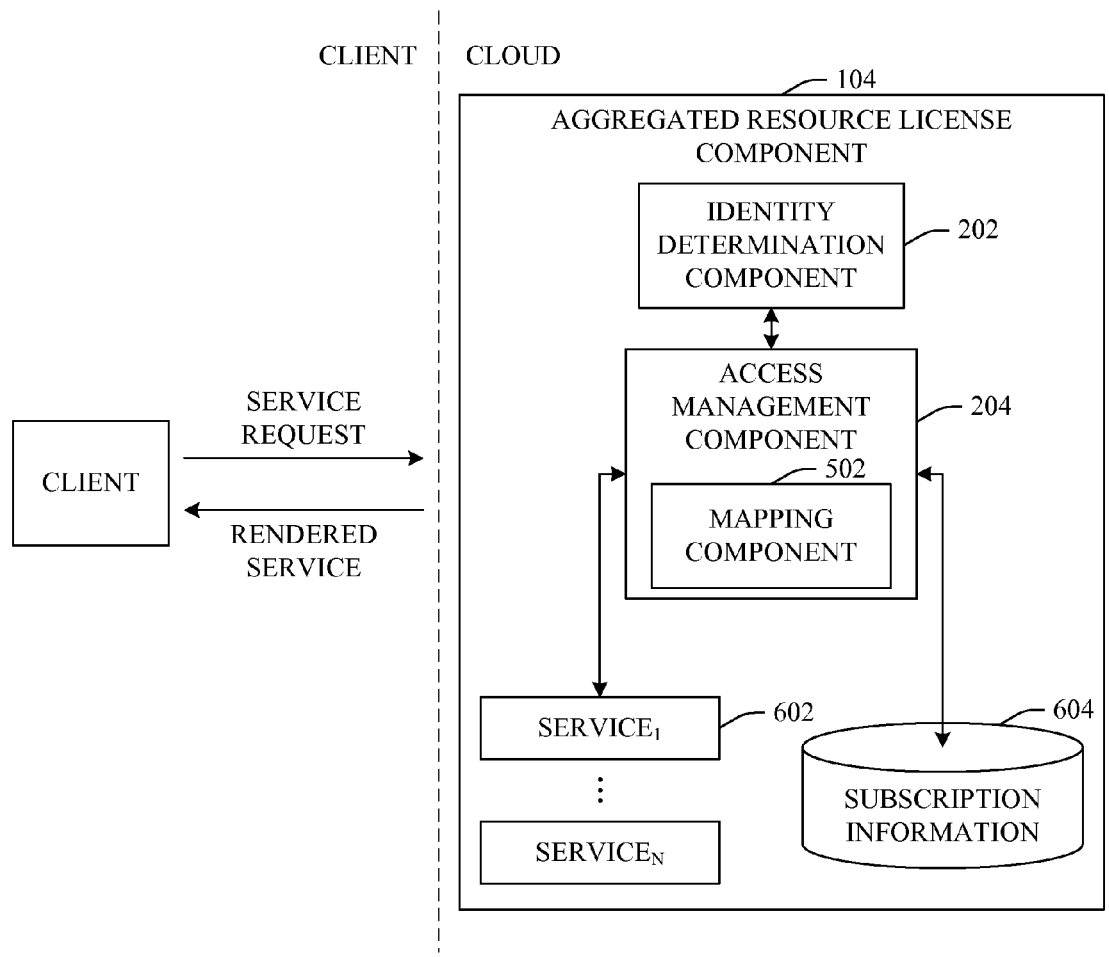
FIG. 6 illustrates a block diagram of an aggregated resource license system that manages access to 'cloud-based' resources (e.g., services) in accordance with an aspect of the innovation.

FIG. 6 illustrates that an alternative aspect of the aggregated resource license component 104 that can be applied to services rather than applications as illustrated in FIG. 5. More specifically, FIG. 6 illustrates that the access management component 204 can be employed to map 1 to N services to appropriate subscription information, where N is an integer. For instance, similar to the application resource examples described above, the access management component 204 of FIG. 6 can be employed to map (e.g., via mapping component 502) services (e.g., news services, stock services) to subscription information 604.

Figure 7:
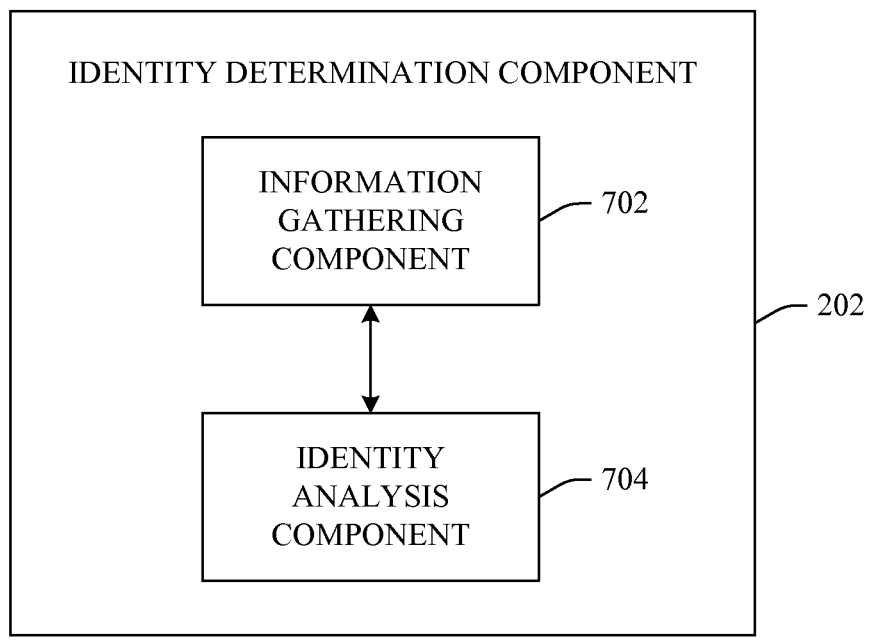
FIG. 7 illustrates a block diagram of an identity determination component in accordance with an aspect of the innovation.

Turning now to FIG. 7, a block diagram of an identity determination component 202 in accordance with an aspect of the specification is shown. In this aspect, the identity determination component 202 can include an information gathering component 702 and an identity analysis component 704. Together, the information gathering component 702 and the identity analysis component 704 can be employed to establish (e.g., determine and/or infer) the past, present or future identity of a user.

Figure 8:
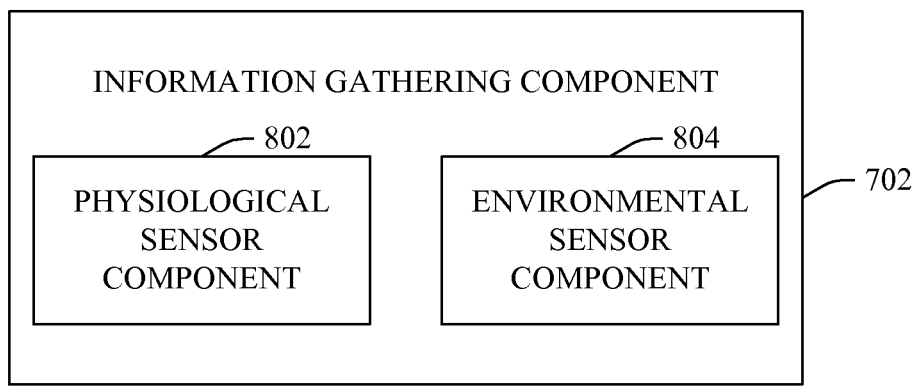
FIG. 8 illustrates a block diagram of an information gathering component in accordance with an aspect of the innovation.

As shown in the block diagram of FIG. 8, the information gathering component 702 can employ a physiological sensor component 802 and/or an environmental sensor component 804. These components (802, 804) can be employed to gather information related to an individual (e.g., biometrics) as well as to the environment (e.g., context). Effectively, this information can be used to determine and/or infer a user identity.

Figure 9:
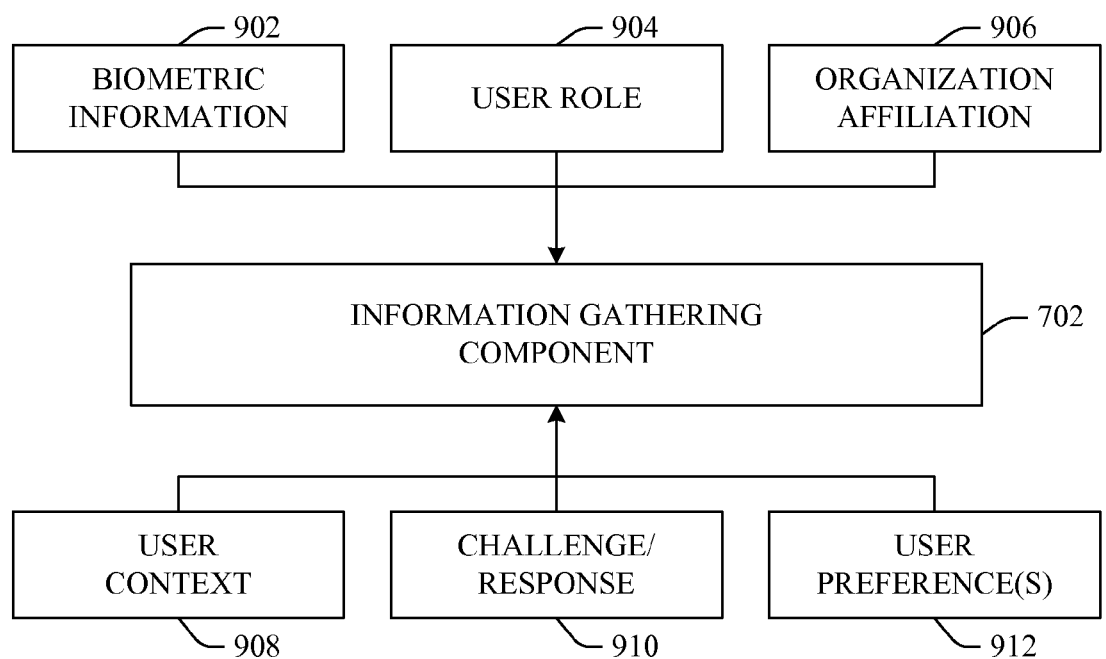
FIG. 9 illustrates a set of data that can be collected via the information gathering component in accordance with an aspect of the innovation.

FIG. 9 illustrates a sample of the types of information that can be gathered via the information gathering component 702. As illustrated, the information gathering component 702 can be employed to gather information including, but not limited to, biometric information 902, user role identification 904, organization affiliation 906, user context information 908, user specific information via challenge/response 910 as well as user preference(s) information 912. As shown in FIG. 8, in aspects, physiological and environmental sensor mechanisms can be employed to assist in gathering of the necessary information.

Figure 10:
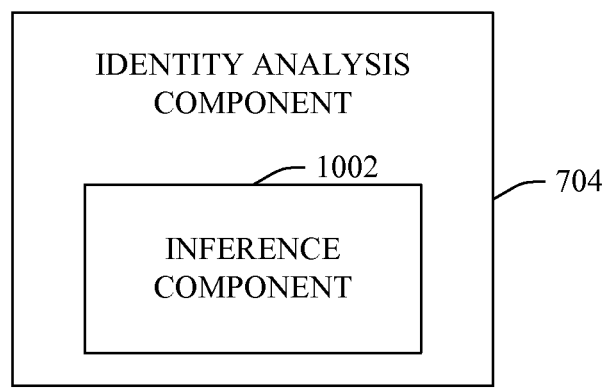
FIG. 10 illustrates a block diagram of an identity analysis component that employs an inference component in accordance with an aspect of the innovation.

Referring now to FIG. 10, a block diagram of an identity analysis component 704 is shown. More particularly, the identity analysis component 704 can include an inference component 1002 that employs MLR to infer an identity based upon available information. Effectively, the MLR or inference component 1002 facilitates automation of one or more features in accordance with the subject innovation.

The subject innovation (e.g., in connection with identifying an individual or mapping an identity to a resource) can employ various MLR-based schemes for carrying out various aspects thereof. For example, a process for determining the identity of a user, a resource preference of a user, etc. can be facilitated via an automatic classifier system and process.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria what is the identity of a user, which resource to render in view of contextual factors, etc.

Figure 11:
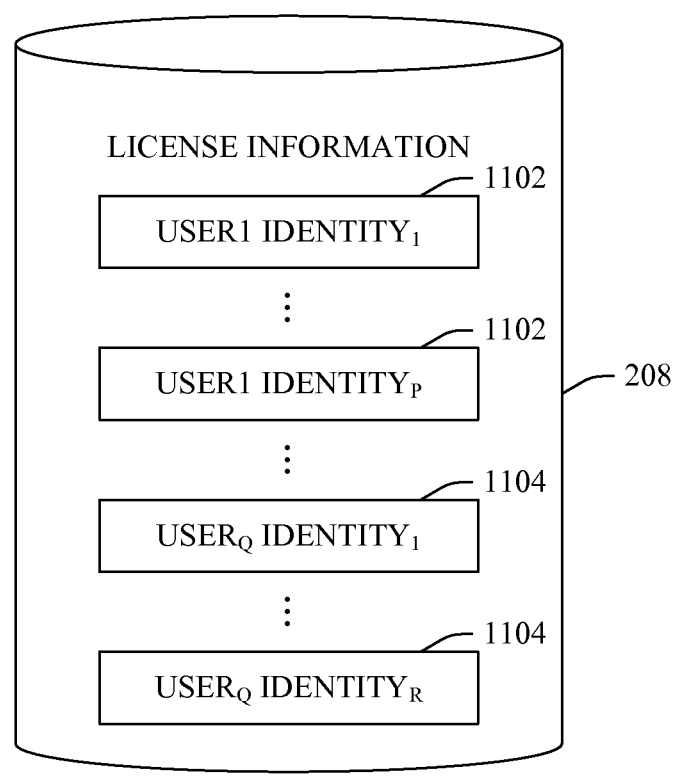
FIG. 11 illustrates a license information store having multiple identities per user in accordance with an aspect of the innovation.

As described above, it is to be understood that multiple identities can be assigned and/or correspond to a user. FIG. 11 illustrates this concept by showing that a User1 can have 1 to P identities and that a UserQ can have 1 to R identities, where P, Q and R are integers. In other words, the license information 208 can maintain multiple identity information that corresponds to multiple users (e.g., 1002, 1004).

By way of example, a single user can have a 'work' identity, a 'home' identity, an 'affiliation' identity, etc. In operation, the described system can be used to establish, via context, biometrics, etc., a particular identity thereafter mapping the identity to available and authorized 'cloud-based' resources. More particularly, once the system determines the actual identity of a user, the system can further employ extrinsic data to determine an applicable identity with respect to an access request.

It is to be understood that an individual acting in a profession or employment capacity may have different rights that when in a home or recreation (e.g., Boy Scout affiliation, church group). As such, it is to be understood that, in addition to establishing the actual identity of a user (e.g., the user is who they purport to be), the system can also manage authorization levels based upon the activity and/or context of the individual. As such, it will be understood that a corporation which employs an individual may hold a license for specific resources that should not follow a user outside of this professional capacity.

In aspects, the user-centric (or identity-centric) aggregated license system as described in this specification can support most any variation of license. For example, a license can be based upon a time of day, a location, a current activity, a current device used and capabilities associated therewith, a number of uses, scope of use, etc. The tracking mechanisms described supra can be employed to monitor and enable enforcement of a particular license. Moreover, the tracking mechanisms can facilitate monetization and billing with respect to use. As well, the tracking mechanisms can analyze use with respect to an identity and suggest modification(s) of a license and/or subscription as a function of historical or predicted use.

Figure 12:
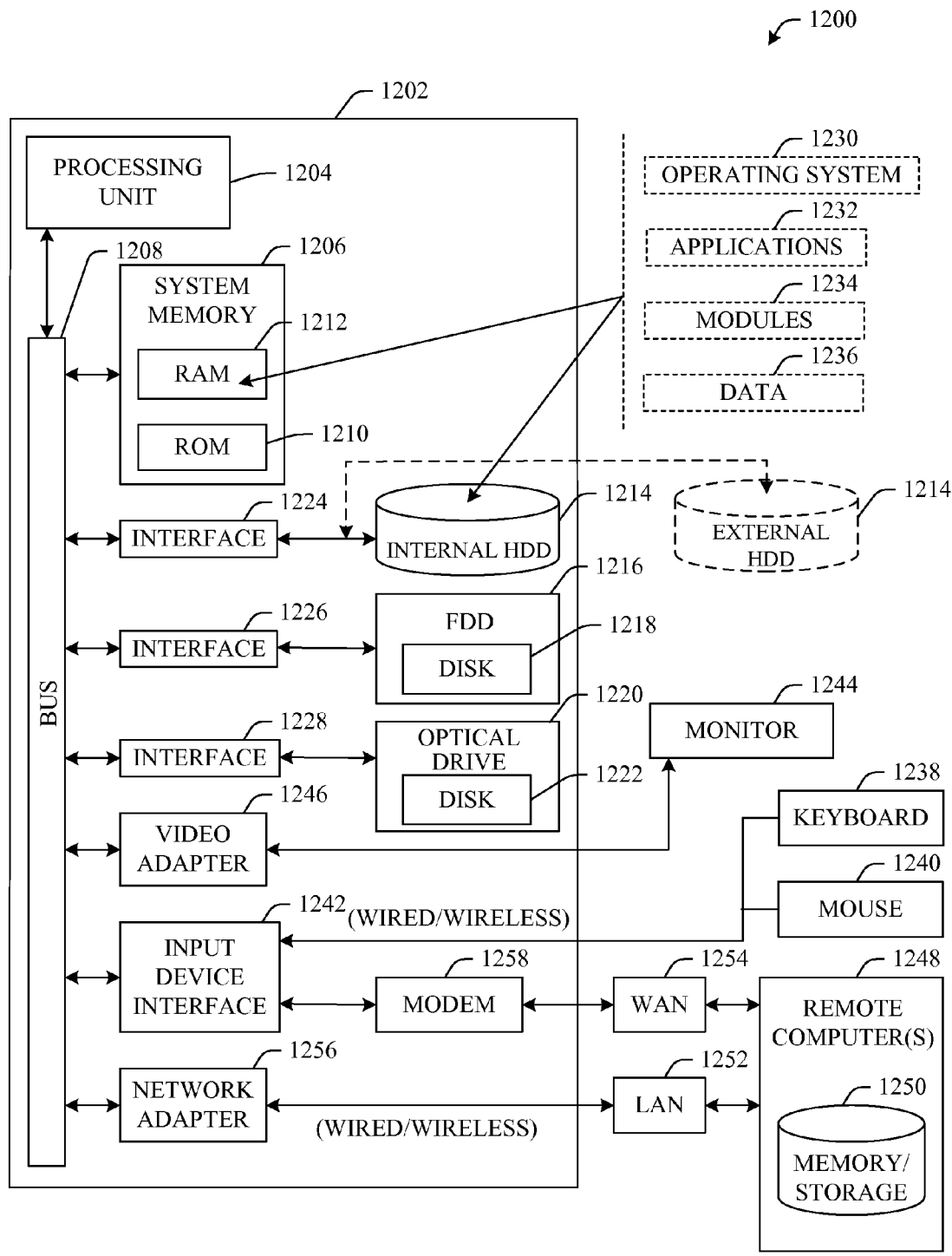
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the innovation includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM)

1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1130 is illustrated. The logical connections depicted include wired/wireless connectivity to a local area network (LAN) 1132 and/or larger networks, e.g., a wide area network (WAN) 1134. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1232 through a wired and/or wireless communication network interface or adapter 1236. The adapter 1236 may facilitate wired or wireless communication to the LAN 1232, which may also include a wireless access point disposed thereon for communicating with the wireless adapter 1236.

When used in a WAN networking environment, the computer 1202 can include a modem 1238, or is connected to a communications server on the WAN 1234, or has other means for establishing communications over the WAN 1234, such as by way of the Internet. The modem 1238, which can be internal or external and a wired or wireless device, is connected to the system bus 1208 via the serial port interface 1242. In a networked environment, program modules depicted relative to the computer 1202, or portions thereof, can be stored in the remote memory/storage device 1230. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
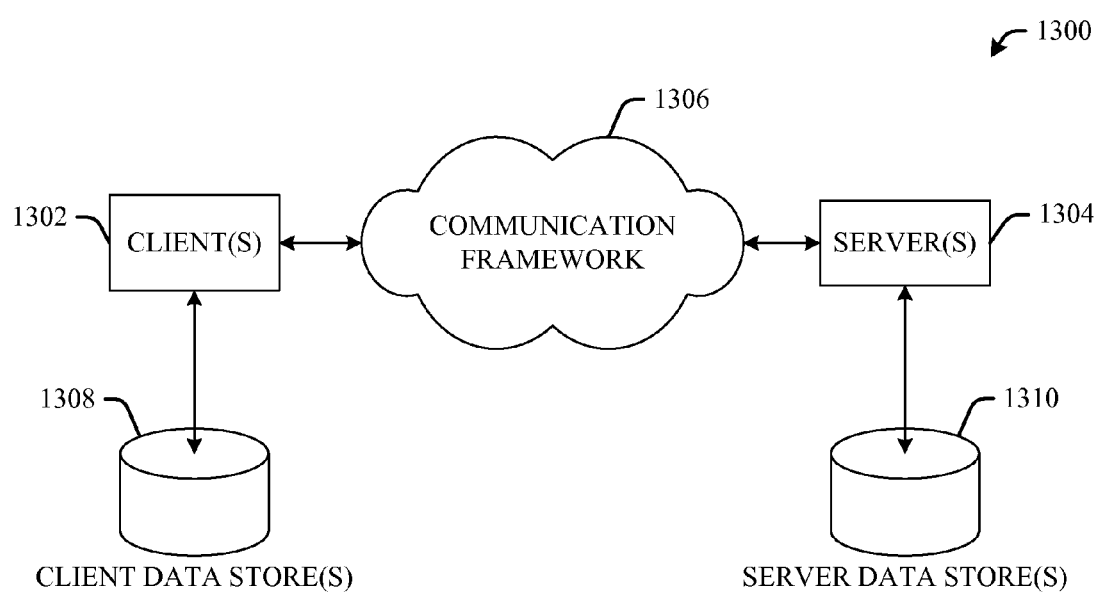
FIG. 13 illustrates a schematic block diagram of an exemplary computing environment in accordance with the subject innovation.

Referring now to FIG. 13, there is illustrated a schematic block diagram of an exemplary computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates user-centric licensing of a plurality of resources, the system comprising:
   an interface component that receives an access request that corresponds to a subset of the resources; and
   an aggregated resource license component to:
      establish identity of a requestor associated with the access request;
      maintain a cloud-based store of multiple resource licenses previously obtained by the requestor;
      determine whether the identity of the requestor is associated with the multiple resource licenses;
      verify that one or more resource license of the multiple resource licenses in the cloud-based store is a resource license of, and allows access to, each resource of the subset of resources;
      allow the requestor to access the subset of resources upon:
         determination that the identity of the requestor is associated with the multiple resource licenses; and
         verification that at least one resource license of each resource of the subset of resources exists in the multiple resource licenses stored in the cloud-based store; and
      when the identity of the requestor is determined to be associated with the multiple resource licenses and the multiple resource licenses are verified to include licenses associated with the subset of resources, generate a token which includes the identity and an aggregation of the multiple resource licenses, the token being used to grant access to the subset of the resources residing off-premise, on-premise, or in combination thereof.

2. The system of claim 1, the aggregated resource license component encrypts the token using a public key associated with the requestor.

3. The system of claim 1, further comprising an access management component that decrypts the token and authorizes access to the subset of resources.

4. The system of claim 3, further comprising an identity determination component that establishes a current identity and compares the current identity to the identity encrypted within the token.

5. The system of claim 1, at least one of the subset of resources is an off-premise resource.

6. The system of claim 1, at least one of the subset of the resources is an on-premise resource.

7. The system of claim 1, the aggregated resource license component comprises:
   an identity analysis component that determines a current identity of the requestor; and
   an access management component that grants or denies access to the subset of resources as a function of the current identity in view of the token.

8. The system of claim 7, further comprising a tracking component that monitors a use of each of the subset of resources and modifies a license right based at least in part upon the use.

9. The system of claim 8, further comprising a mapping component that maps the current identity to the license right.

10. The system of claim 1, further comprising an information gathering component that establishes information that relates to the identity of the requestor.

11. The system of claim 10, further comprising an identity analysis component that evaluates the information to determine the identity.

12. The system of claim 10, the information gathering component employs at least one of a physiological and an environmental sensor to establish the information.

13. A computer-implemented method of controlling access to resources, the method comprising:
   receiving a request for access to a subset of the resources;
   determining or inferring a current context of a requestor of the request, wherein the current context includes a business context or a personal context of the requestor;
   determining or inferring a current identity of multiple identities of the requestor based in part on the current context;
   determining whether the current identity of the requestor is authorized to use multiple persistent licenses, the multiple persistent licenses including at least one persistent license that is valid for each resource of the subset of the resources;
   generating an object that identifies the requestor;
   when the current identity of the requestor is determined to be authorized to use the multiple persistent licenses, mapping the object to the current identity of the requestor and to an aggregation of the multiple persistent licenses in view of the subset of the resources, wherein the object conveys both the identity and license rights associated with the multiple persistent licenses; and
   transferring the object to the requestor.

14. The method of claim 13, further comprising:
   providing the object to a source of one of the resources; and
   analyzing the object to authenticate the requestor and to grant or deny access to the one of the resources.

15. The method of claim 14, further comprising encrypting the object using a public key of the requestor.

16. The method of claim 15, further comprising:
decrypting the object to create a decrypted object; and
granting or denying access to the subset of the resources as a function of the decrypted object.

17. The method of claim 14, further comprising authorizing access based upon scope of at least one of the aggregated multiple persistent licenses.

18. A computer-executable protocol that facilitates managing multiple resource licenses associated with a plurality of resources, the protocol to facilitate the performance of acts, the acts comprising:
receiving a request from a user for access to a subset of the plurality of resources, the subset of the plurality of resources are located on-premise or off-premise;
establishing multiple different identities of the user, wherein the multiple different identities include a business identity and a personal identity of the user;
generating an object that:
aggregates the multiple resource licenses into an aggregation of multiple resource licenses; and
maps each of the multiple different identities of the user to a different subset of the multiple resource licenses, the object including:
the multiple different identities;
a mapping of each of the multiple different identities to a corresponding different subset of the multiple resource licenses; and
the aggregation of the multiple resource licenses; and
transmitting the object to the user, the object enables access to at least a portion of the subset of the plurality of resources from a plurality of disparate sources based in part on a current identity of the multiple different identities of the user.

19. The computer-executable protocol of claim 18, the acts further comprising encrypting the object using a public key of the user.

20. The computer-executable protocol of claim 19, the acts further comprising:
decrypting the object to create a decrypted object;
authenticating the user as a function of the decrypted object; and
authorizing access to the at least a portion of the subset of the plurality of resources as a function of the decrypted object.

\* \* \* \* \*